United States Patent
Grolimund et al.

(10) Patent No.: US 9,233,424 B2
(45) Date of Patent: Jan. 12, 2016

(54) ADAPTER FOR HOLDING A HOLE SAW ON A POWER TOOL

(71) Applicant: Robert Bosch GmbH, Stuttgart (DE)

(72) Inventors: Daniel Grolimund, Zuchwil (CH); Martin Richter, Zuchwil (CH)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 13/941,136

(22) Filed: Jul. 12, 2013

(65) Prior Publication Data

US 2014/0017023 A1 Jan. 16, 2014

(30) Foreign Application Priority Data

Jul. 16, 2012 (DE) .......................... 10 2012 212 381

(51) Int. Cl.
*B23B 51/04* (2006.01)
*B23B 51/12* (2006.01)

(52) U.S. Cl.
CPC ......... *B23B 51/0473* (2013.01); *B23B 51/0406* (2013.01); *B23B 51/12* (2013.01); *Y10T 408/895* (2015.01); *Y10T 408/95* (2015.01); *Y10T 408/957* (2015.01)

(58) Field of Classification Search
CPC ............ B23B 51/0473; B23B 51/0406; Y10T 408/895; Y10T 408/94; Y10T 408/95
See application file for complete search history.

(56) References Cited

U.S. PATENT DOCUMENTS

| | | | | |
|---|---|---|---|---|
| 3,647,310 A * | 3/1972 | Morse | ........................ | 408/239 R |
| 3,784,316 A * | 1/1974 | Bittern | ........................ | 408/204 |
| 5,108,235 A * | 4/1992 | Czyzewski | .................... | 408/204 |
| 5,154,552 A * | 10/1992 | Koetsch | ........................ | 408/204 |
| 5,226,762 A * | 7/1993 | Ecker | ........................ | 408/204 |
| 5,352,071 A * | 10/1994 | Cochran et al. | ............... | 408/204 |
| 5,690,452 A * | 11/1997 | Baublits | ........................ | 408/204 |
| 7,104,738 B2 * | 9/2006 | Cantlon | ........................ | 408/204 |
| 2014/0126973 A1* | 5/2014 | Pamatmat | .................... | 408/240 |
| 2015/0071721 A1* | 3/2015 | Piper et al. | .................... | 408/204 |

FOREIGN PATENT DOCUMENTS

| | | | | |
|---|---|---|---|---|
| CA | 2356808 A1 * | 3/2002 | ............. | B23B 31/02 |
| CN | 201446268 U * | 5/2010 | ............. | B23B 51/04 |
| DE | 10 2007 022 186 A1 | 11/2008 | | |
| DE | 102008044682 A1 * | 3/2010 | ............. | B23B 31/02 |
| DE | 202013006690 U1 * | 9/2013 | ............. | B27B 5/12 |
| DE | 202013102478 U1 * | 11/2013 | ............. | B23B 31/107 |
| EP | 1923156 A2 * | 5/2008 | ............. | B23B 31/107 |
| EP | 2080574 A1 * | 7/2009 | ............. | B23B 51/04 |
| GB | 1521839 A * | 8/1978 | ............. | B23B 51/04 |
| GB | 2295110 A * | 5/1996 | ............. | B23B 51/04 |
| SE | 9803380 A * | 4/2000 | ............. | B23B 51/04 |
| TW | 337436 U * | 8/2008 | ............. | B23B 51/05 |
| WO | WO 9826890 A1 * | 6/1998 | ............. | B23B 51/04 |
| WO | 2005/000506 A2 | 1/2005 | | |
| WO | WO 2006122417 A1 * | 11/2006 | ............. | B23Q 3/14 |
| WO | WO 2009111751 A1 * | 9/2009 | ............. | B23B 51/04 |

* cited by examiner

*Primary Examiner* — Eric A Gates
*Assistant Examiner* — Donte Brown
(74) *Attorney, Agent, or Firm* — Maginot, Moore & Beck LLP

(57) ABSTRACT

An adapter for holding a hole saw on a power tool includes a driver, a threaded spindle, and a connecting bushing, via which the threaded spindle and the driver are coupled in a direction of rotation.

19 Claims, 3 Drawing Sheets

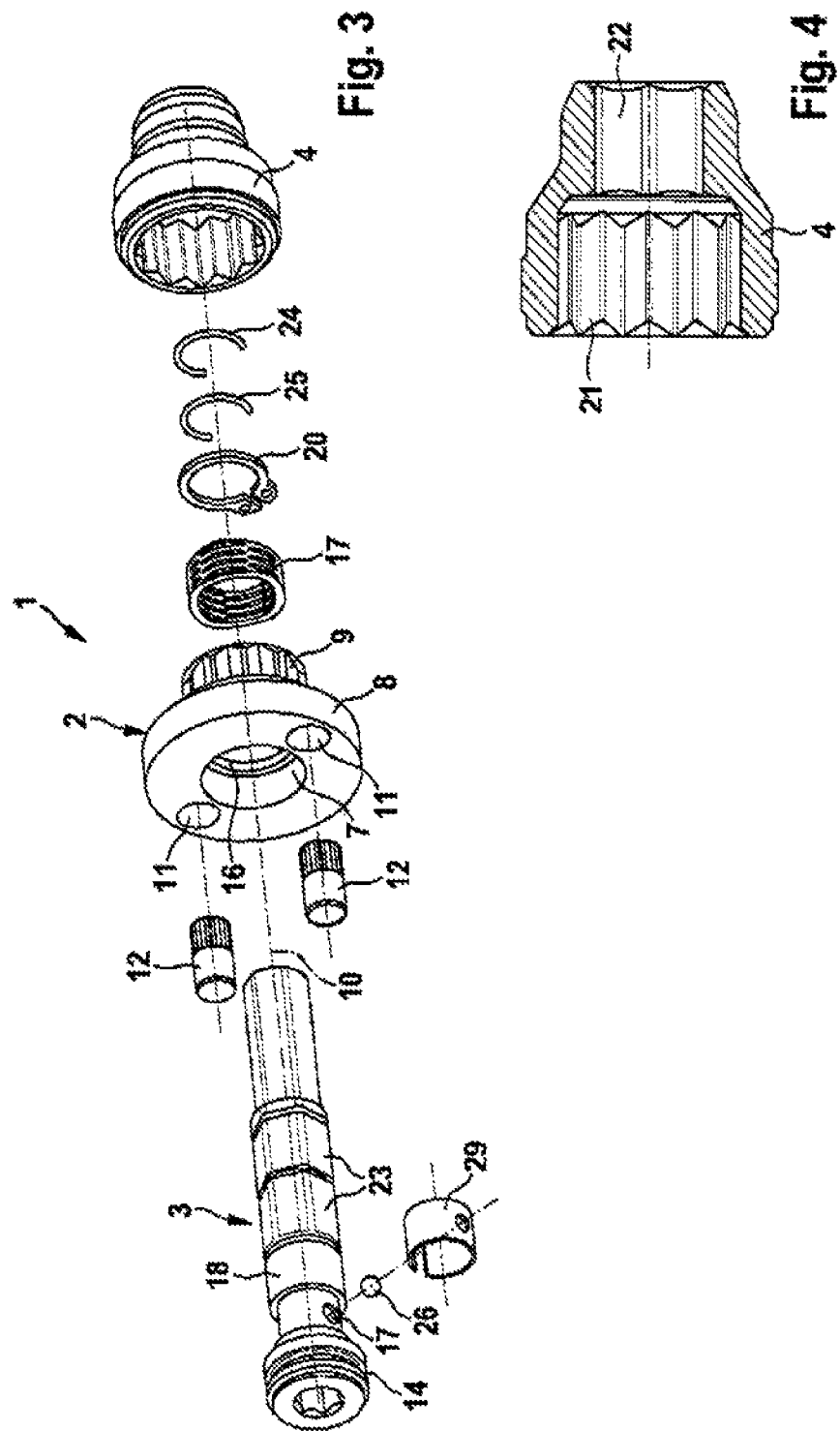

ADAPTER FOR HOLDING A HOLE SAW ON A POWER TOOL

This application claims priority under 35 U.S.C. §119 to patent application no. DE 10 2012 212 381.4, filed on Jul. 16, 2012 in Germany, the disclosure of which is incorporated herein by reference in its entirety.

BACKGROUND

The disclosure relates to an adapter for holding a hole saw on a power tool, according to the preamble of claim 1.

Known from DE 10 2007 022 186 A1 is an adapter by means of which a hole saw can be connected to the chuck of a hand-guided power tool. The adapter has a driver having a disk-shaped driver flange, protruding axially on the end face of which are two diametrically opposite driver pins, at a radial distance from the longitudinal axis, which, when in the mounted state, project into associated recesses in the base of the hole saw. The adapter additionally has a threaded spindle, which is guided through a central recess in the driver flange and, adjacently to an end face, carries a threaded portion that can be screwed to a thread in the base of the hole saw. On the side that faces away from the driver pins, the driver flange is realized so as to constitute a single, integral part with a polygon for connecting to a coupling part that, at the other end, is for connecting to the chuck of the power tool.

SUMMARY

The disclosure is based on the object of realizing, by simple design measures, an adapter for holding a hole saw on a power tool, allowing ease of mounting. This object is achieved, as described herein.

The adapter according to the disclosure is used for fastening a hole saw to a power tool, in particular a hand-guided power tool such as, for example, an electric hand drill. Via the adapter, the hole saw is connected to a chuck of the power tool and driven by the latter. Via the adapter, the hole saw can be coupled directly to the chuck of the power tool, without the use of any additional coupling part. In particular, connecting and mounting are also effected without the use of any tool, thereby facilitating handling.

The adapter has a driver, which comprises a driver flange, disposed on one end face of which there is at least one axially protruding driver pin at a radial distance from the rotational axis of the adapter. The driver pin, when in the mounted state, projects into a corresponding recess in the base of the hole saw and serves to effect rotational coupling between the hole saw and the adapter, such that a torque can be transmitted between the adapter and the hole saw.

There is a central recess made in the driver flange, to receive a threaded spindle that, on the end face, has a threaded portion for connecting to the hole saw. At the base, the hole saw has a central recess having an internal thread, into which the threaded portion on the end face of the threaded spindle can be screwed. The hole saw is axially secured on the adapter via the connection of the threaded portion to the internal thread.

The threaded spindle is rotatably received in the driver, and the driver and the threaded spindle can execute a rotation relative to each other. This facilitates coupling of the adapter to the hole saw, and enables the hole saw to be placed on the adapter without the aid of tools. The hole saw can be first screwed on to the threaded portion of the threaded spindle and then pushed axially on to the driver pin or pins. Also possible is the inverse sequence, in which the hole saw is first pushed on to the driver pin or pins, and subsequently screwed to the threaded spindle.

The threaded spindle and the driver do not have a direct, form-fit coupling in the direction of rotation, thereby ensuring that there can be relative rotation between the driver and the threaded spindle. A rotational coupling between the driver and the threaded spindle is achieved indirectly, via a connecting bushing, which is coupled both to the threaded spindle and to the driver in a coupling position, in the direction of rotation. The connecting bushing is displaced axially between this coupling position and a release position, in which there is no continuous rotational coupling between the threaded spindle, the connecting bushing and the driver. In the release position, the rotational coupling is undone, at least between one of the components and the connecting bushing, for example between the connecting bushing and the driver. Upon the axial displacement into the coupling position, this coupling is restored, such that, in the direction of rotation, the connecting bushing is located in the torque transmission path between the threaded spindle and the driver.

Since a rotational coupling can be established between the threaded spindle and the driver, via the connecting bushing, it is possible for the adapter to be driven via the threaded spindle, despite the absence of a direct rotational coupling between the threaded spindle and the driver. Driving of the adapter can therefore be effected directly, or indirectly via the threaded spindle, wherein, in the case of an indirect coupling, a coupling part is still interposed between the threaded spindle and the chuck of the power tool, and, in the case of direct coupling, the threaded spindle is directly connected to the chuck. Retained at the same time are the advantages of easier mounting of the hole saw, when the connecting bushing is pushed back in the release position, with the rotational coupling between the threaded spindle and the driver having been undone.

The connecting bushing, on its inside, advantageously has two connecting portions, spaced apart axially, of which a first connecting portion is assigned to the threaded spindle, and the second connecting portion is assigned to the driver, and in each case a rotational coupling to the threaded spindle and to the driver, respectively, can be established via the connecting portions. The connecting portions are each expediently realized as an internal polygon, the associated connecting portions on the threaded spindle and on the driver, respectively, being accordingly realized as an outer polygon. The polygonal portions may be realized, for example, as a hexagon in the region of the connection between the threaded spindle and the connecting bushing, and as a bihexagon in the region of the connection between the driver and the connecting bushing.

Advantageously, the connecting portions in the connecting bushing differ in their magnitude of diameter. According to a preferred embodiment, the connecting portion for connecting to the threaded spindle has a smaller diameter than the connecting portion for connecting to the driver.

This enables the connecting bushing, in the coupling position, to be pushed on to an associated connecting portion of the driver that, in the form of a bushing, sits on the threaded spindle. In order to change over to the release position, it is only necessary for the connecting bushing to be pushed back axially from the connecting portion of the driver.

To enable the relative rotation between the threaded spindle and the driver when the connecting bushing is in the release position, it is expedient that both the threaded spindle and the driver each have a rotation portion, having a cylindrical circumferential surface, in the region of the recess. The driver sits on the threaded spindle, wherein the rotation portions of the threaded spindle and the driver are located at the same level axially, in order to enable the relative rotation.

According to a further expedient embodiment, a spring element is disposed between the driver and the threaded spindle, which spring element exerts an axial spring force between these components. The driver can be pushed back axially relative to the threaded spindle, against the force of the spring element, wherein, in this position, the threaded portion on the threaded spindle can be screwed into the base of the saw. When the threaded spindle has been screwed in, the spring force of the spring element presses the driver pin or pins axially against the hole saw. It may be expedient for the spring element to be disposed on the end face of the driver that faces axially away from the driver pin, and to be supported against a stop on the circumferential surface of the threaded spindle. Advantageously, the spring element, which is preferably realized as a coil spring, is overlapped by the connecting bushing when in the coupling position.

According to a further aspect of the disclosure, the adapter comprises the driver, and comprises the threaded spindle, which can be inserted in a recess in the driver, wherein the threaded spindle can be screwed, by an end-face threaded portion, into the hole saw. The driver has a driver flange, protruding axially on which there is at least one driver pin, which is disposed at a radial distance from the rotational axis of the adapter. The driver pin, when in the mounted state, projects into an associated recess in the base of the hole saw and serves to transmit torque.

On the side that is axially opposite to the threaded portion, the threaded spindle is realized so as to constitute a single, integral part with a clamping arbor for connecting to the chuck of the power tool. In this embodiment, the clamping arbor constitutes an integral, single-part or single-piece component with the threaded spindle, such that no further components, for example coupling parts, are required for connection to the chuck.

According to an expedient embodiment, the constitution of the clamping arbor and the threaded spindle as a single, integral part is combined with the capacity for relative rotation between the threaded spindle and the driver, and with the coupling in the direction of rotation, via the connecting bushing.

The driver pin is advantageously realized separately from the driver inserted in an associated recess in the driver. In principle, however, it is also possible for the driver pin and the driver to be realized as a single, integral part. Furthermore, it is expedient for at least two diametrically opposite driver pins to be disposed on the driver flange, and for the driver pins each to be located at a radial distance from the rotational axis of the adapter.

A central receiving opening, extending in the axial direction, can be made in the end face of the threaded spindle, on the side that faces toward the threaded portion, for the purpose of receiving a centering or pilot drill. For the purpose of fixing the drill, it is expedient for a radial opening, for receiving a clamping element, for example a clamping ball, to be made in the wall that delimits the receiving opening, which clamping element is overlapped by a securing portion of the driver and held in the clamping position when the hole saw has been mounted.

BRIEF DESCRIPTION OF THE DRAWINGS

Further advantages and expedient embodiments are given by the further claims, the description of the figures and the drawings. In the drawings:

FIG. 3 shows the adapter in an exploded representation, FIG. 4 shows a longitudinal section through the connecting bushing.

In the figures, components that are the same are denoted by the same references.

DETAILED DESCRIPTION

Figure 1:
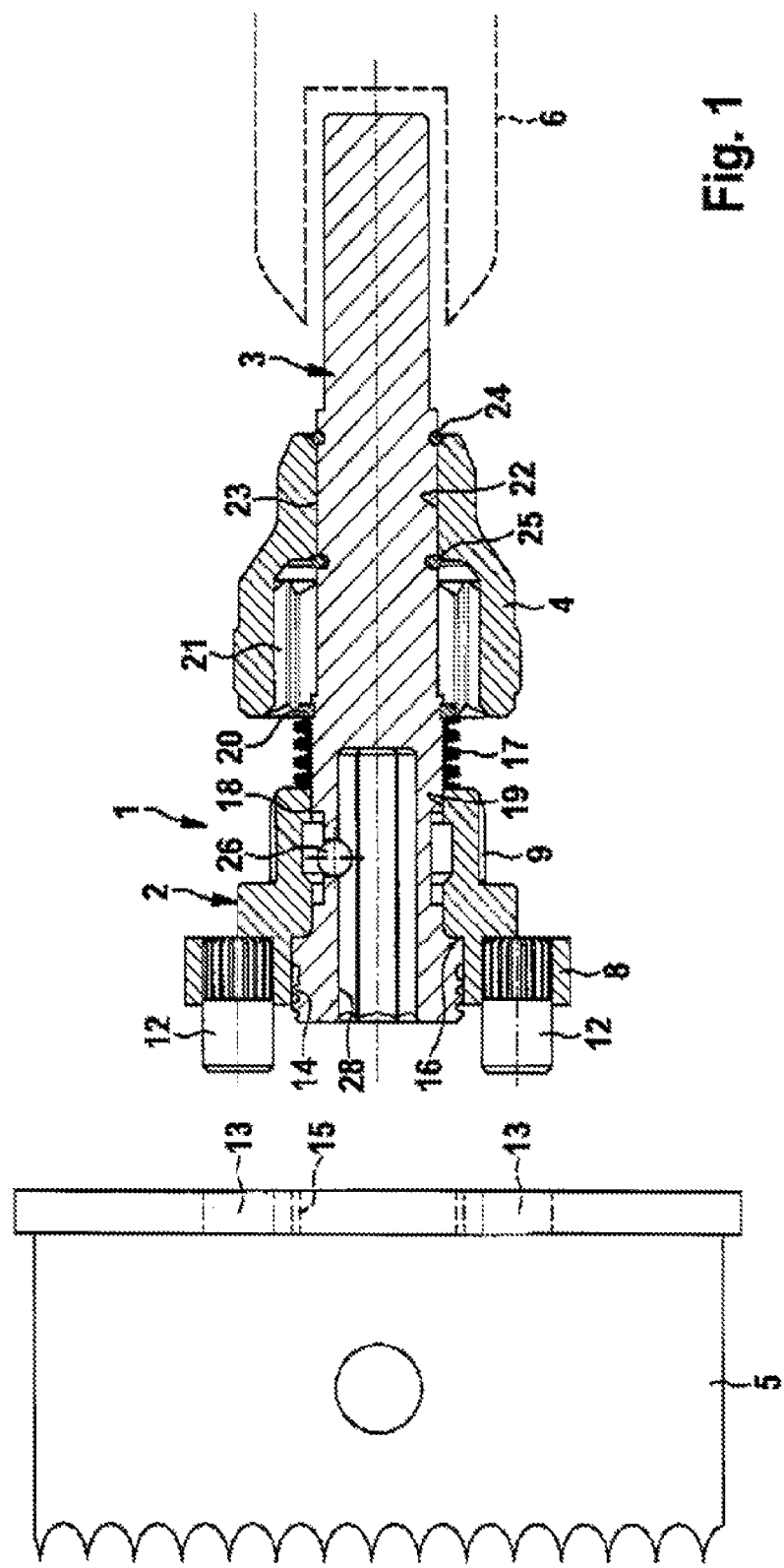
FIG. 1 shows a longitudinal section through an adapter for holding a hole saw on a power tool, having a driver and a threaded spindle, and having a connecting bushing, which has been moved into a release position.
Figure 2:
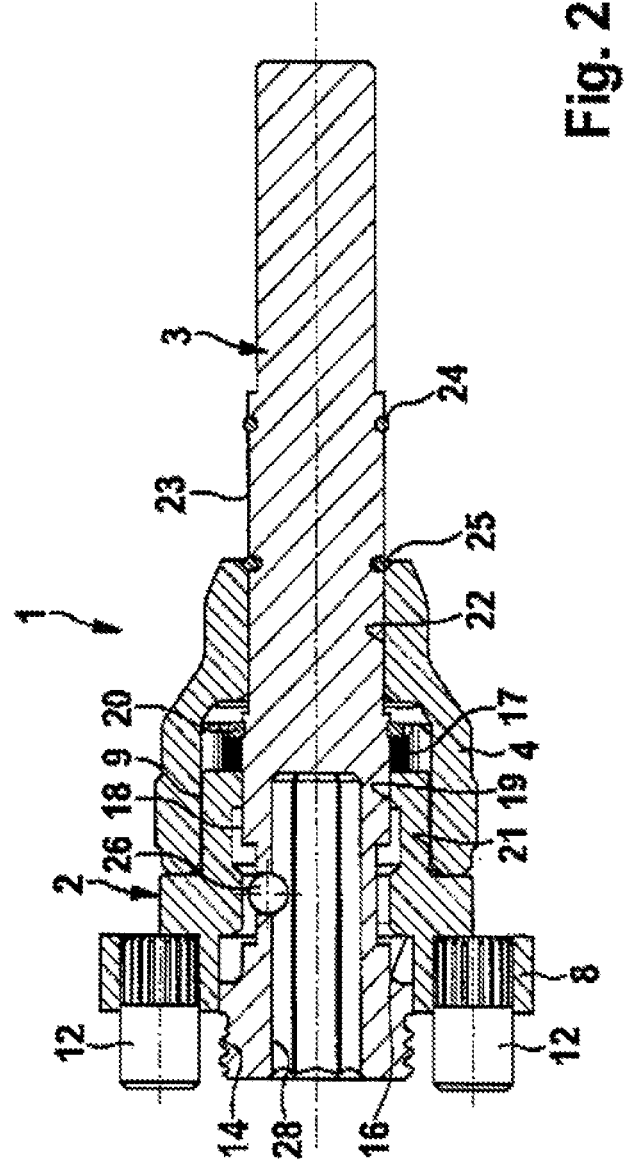
FIG. 2 shows the adapter in section, with the connecting bushing in the coupling position, in which a rotational coupling exists between the threaded spindle and the driver.

Represented in FIGS. 1 to 3 is an adapter 1 for connecting and fixing a hole saw 5 to the chuck 6 of a power tool. The adapter 1 comprises, as essential components, a driver 2, a threaded spindle 3 and a connecting bushing 4. The driver 2 is realized in the form of a bushing, and is provided with a central recess 7, into which the threaded spindle 3 can be introduced. The driver 2 has a driver flange 8, and a polygonal portion 9, which is realized as an external polygon, in particular as a bihexagon, and directly adjoins axially an end face of the driver flange 8. The driver flange 8 and the polygonal portion 9 are realized as a single, integral part. The polygonal portion 9 has a smaller diameter than the driver flange 8.

Made in the end face of the driver flange 8 that faces away from the polygonal portion 9 are two diametrically opposite receiving openings 11, at a radial distance from the rotational axis 10, which each serve to receive a respective driver pin 12. The driver pins 12, when in the mounted state, project into associated openings 13 in the base of the hole saw 5 (FIG. 1). By means of the driver pins 12, a rotational coupling is achieved between the adapter 1 and the hole saw 5.

On its side that is adjacent to the hole saw 5, the threaded spindle 3 has a threaded portion 14 having a wider diameter, which can be inserted in the central recess 7 in the driver flange 8 of the driver 2 and sits on an annular shoulder 16 in the driver. When in the mounted state, the threaded portion 14 is screwed into an internal thread 15 in the base of the hole saw 5. By means of the connection between the threaded portion 14 and the internal thread 15, the hole saw 5 is held axially on the adapter 1.

The driver 2 and the threaded spindle 3 are held so as to be axially displaceable in relation to each other between the two positions represented in FIGS. 1 and 2. In FIG. 1, the radially widened threaded portion 14 sits on the annular shoulder 16. In FIG. 2, the threaded portion 14 is disposed at a distance from the annular shoulder 16. Accordingly, in FIG. 1, the axial end face of the threaded spindle 3 has been displaced axially backward relative to the free end face of the driver pins 12, whereas, in FIG. 2, the end face of the threaded spindle 3 is located at approximately the same level as the free end face of the driver pins 12.

On the circumferential surface of the threaded spindle 3 there is a cylindrical rotation portion 18, which, in the mounted state, acts in combination with a rotation portion 19 on the inside of the driver 2. The rotation portions 18, 19 bear directly on each other, such that the driver 2 and the threaded spindle 3 can execute a relative rotation in relation to each other.

The driver 2 and the threaded spindle 3 are axially supported against each other via a spring element 17, which is realized as a coil spring and pushed on to the threaded spindle 3. The spring element 17 is supported axially, at one end, on a retaining ring 20, which is fitted on to the circumferential surface of the threaded spindle 3 and, at the other end, on the end face of the driver 2, at the level of the polygonal portion 9. In the initial state according to FIG. 1, the spring element 17 presses the driver 2 axially forward, such that the end face of the threaded spindle 3 is displaced axially backward, at the level of the threaded portion 14, relative to the free end face of the driver pins 12. As the threaded portion 14 is screwed into the associated internal thread 15 on the hole saw 5, the threaded spindle 3 is moved forward relative to the driver 2, as a result of which the spring element 17 becomes compressed (FIG. 2), and the axial spring force increases correspondingly. In the coupling position according to FIG. 2, the spring element 17 is overlapped by the connecting bushing 4.

The connecting bushing 4 performs the function of coupling the driver 2 and the threaded spindle 3 in the direction of rotation, such that a relative rotational movement between the driver 2 and the threaded spindle 3 is no longer possible. This state is represented in FIG. 2, in which the connecting bushing 4 has been shifted axially into its coupling position. In FIG. 1, by contrast, the connecting bushing 4 is in its release position, in which there is no continuous coupling between the driver 2, the connecting bushing 4 and the threaded spindle 3 in the direction of rotation, since the rotational coupling between the connecting bushing 4 and the driver 2 has been released.

As can also be seen from the sectional representation according to FIG. 4, the connecting bushing 4 has two internal polygons 21, 22, spaced apart axially, which correspond to the polygonal portion 9, realized as an external polygon, on the driver 2, and to an external polygon 23 on the circumferential surface of the threaded spindle 3. The internal polygon 21, which corresponds to the polygonal portion 9 of the driver 2, has a greater diameter than the internal polygon 22, which corresponds to the external polygon 23 on the circumferential surface of the threaded spindle 3.

In the release position according to FIG. 1, the connecting bushing 4 has been drawn back axially; in this position, a rotational coupling exists only between the internal polygon 22 and the external polygon 23 of the threaded spindle 3. By contrast, the internal polygon 21 and the polygonal portion 9 of the driver 2 are out of engagement, such that the driver 2 and the threaded spindle 3 can rotate freely in relation to each other.

In the coupling position according to FIG. 2, the connecting bushing 4 has been pushed forward axially, the internal polygon 21 overlaps the polygonal portion 9 of the driver 2 in a form-fitting manner, such that there is a continuous coupling in the direction of rotation, from the threaded spindle 3 to the connecting bushing 4, and further from the connecting bushing 4 to the driver 2; in this position, therefore, there is also a rotational coupling between the driver 2 and the threaded spindle 3.

Set into the circumferential surface of the threaded spindle 3 are two retaining rings 24, 25, which are axially spaced apart from each other and which constitute frictional stops for the connecting bushing 4 in the release position and in the coupling position, respectively.

Made in the end face of the threaded spindle 3, adjacent to the threaded portion 14, there is an axial receiving opening 28, in the form of a blind hole, which serves to receive a pilot, or centering, drill. For the purpose of securing the drill in the receiving opening 28, made in the wall that delimits the receiving opening 28 there is a radial opening 27, in which a clamping element 26, in the form of a clamping ball, is inserted. The clamping ball 26 is held in its position by a sleeve 29. As is evident from comparison of FIGS. 1 and 2, in the initial position according to FIG. 1 a radially outwardly widened portion is disposed on the inside of the driver 2, at the level of the clamping ball 26, allowing the clamping ball 26 to yield radially when the pilot drill is inserted in the central receiving opening 28. By contrast, when the driver 2 is displaced axially, as can be seen from FIG. 2, a portion that projects further inward radially comes level with the clamping ball 26, such that radial yielding of the clamping ball 26 is prevented. In this position, a pilot, or centering, drill is axially secured in the receiving opening 28.

What is claimed is:

1. An adapter for holding a hole saw on a power tool comprising:
   a driver defining (i) a recess, and (ii) a driver flange having at least one axially protruding driver pin;
   a threaded spindle including an end-face threaded portion, the threaded spindle being configured to be inserted in the recess so as to be rotatable in the recess; and
   a connecting bushing configured to couple the threaded spindle and the driver in a direction of rotation, and the connecting bushing being held so as to be axially displaceable between a release position and a coupling position,
   wherein in the coupling position the connecting bushing is connected in a form-fitting manner in a circumferential direction both to the threaded spindle and to the driver.

2. The adapter according to claim 1, wherein:
   the driver includes a polygonal portion,
   the polygonal portion is disposed adjacently to the driver flange, and
   an internal polygon in the connecting bushing is assigned to the polygonal portion.

3. The adapter according to claim 1, wherein:
   the threaded spindle further includes a polygonal portion, and
   an internal polygon in the connecting bushing is assigned to the polygonal portion.

4. The adapter according to claim 1, wherein the threaded spindle includes a first rotation portion, having a cylindrical circumferential surface, to which is assigned a second rotation portion, having a cylindrical inner circumference, in the recess of the driver.

5. The adapter according to claim 1, further comprising:
   a spring element defining an axial direction of action, the spring element being disposed between the driver and the threaded spindle.

6. The adapter according to claim 5, wherein:
   the spring element is configured to sit on the threaded spindle, and
   the spring element is overlapped by the connecting bushing.

7. The adapter according to claim 1, wherein, on a side of the threaded spindle that is axially opposite to the end-face threaded portion, the threaded spindle constitutes a single, integral part with a clamping arbor configured to connect to a clamping chuck of the power tool.

8. The adapter according to claim 1, wherein:
   the driver further defines at least one receiving opening;
   the at least one driver pin is realized separately from the driver, and
   the at least one driver pin is inserted in the receiving opening.

9. The adapter according to claim 1, wherein at least two diametrically opposite driver pins are disposed on the driver.

10. The adapter according to claim 1, wherein:
    a receiving opening is defined in an end-face of the threaded spindle on a side that faces toward the end-face threaded portion, and the receiving opening is configured to receive a pilot or centering drill.

11. The adapter according to claim 10, wherein:
a wall delimits the receiving opening,
a radial opening is defined in the wall, and
the radial opening is configured to receive a clamping element.

12. The adapter according to claim 10, wherein:
a sidewall of the receiving opening defines a radial opening; and
a clamping element is at least partially received in the radial opening and is configured to constrain axial movement of the pilot or centering drill when the pilot or centering drill is received in the receiving opening by extension of at least a portion of the clamping element into the receiving opening.

13. The adapter according to claim 12, further comprising a sleeve configured to constrain the clamping element at least partially within the radial opening.

14. The adapter according to claim 13, wherein the driver includes
a first portion that is directly radially outward from the clamping element when the connecting bushing is in the coupling position, the first portion configured to radially constrain the clamping element at least partially within the receiving opening to constrain the axial movement of the pilot or centering drill within the receiving opening; and
a second portion that is directly radially outward from the clamping element when the connecting bushing is in the release position, the second portion configured to allow the clamping element to move radially out of the receiving opening such that the axial movement of the pilot or centering drill relative to the receiving opening is not constrained by the clamping element.

15. The adapter according to claim 12, wherein the clamping element includes a clamping ball.

16. The adapter according to claim 1, wherein:
the driver further defines a first rotation portion in the recess;
the threaded spindle further defines a second rotation portion on a circumferential surface of the threaded spindle; and
the first rotation portion is in direct opposition to the second rotation portion such that the driver and the threaded spindle are allowed to rotate relative to each other.

17. The adapter according to claim 1, further comprising a biasing element configured to axially bias the driver in a direction away from the threaded spindle.

18. The adapter according to claim 17, wherein the biasing element includes a coil spring.

19. The adapter according to claim 17, further comprising a retaining ring that axially constrains a first end of the biasing element, wherein the driver axially constrains a second end of the biasing element opposite the first end.

* * * * *